Patented Feb. 10, 1925.

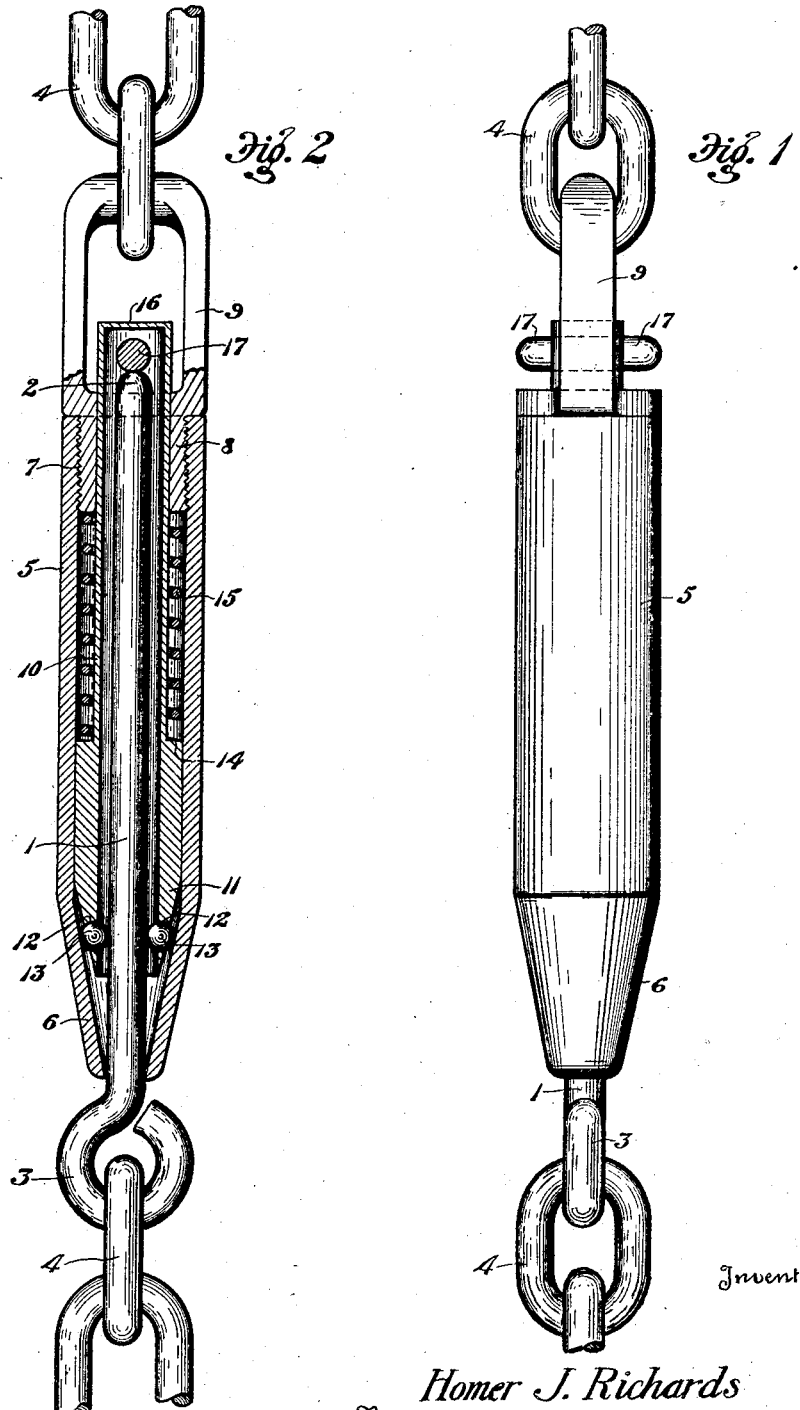

1,525,953

UNITED STATES PATENT OFFICE.

HOMER J. RICHARDS, OF CARROLLTON, OHIO.

CHAIN CONNECTER.

Application filed March 24, 1922. Serial No. 546,352.

*To all whom it may concern:*

Be it known that I, HOMER J. RICHARDS, a citizen of the United States, residing at Carrollton, in the county of Carroll and State of Ohio, have invented a new and useful Chain Connecter, of which the following is a specification.

This invention relates to chain connecters such as are used in connecting separable tire chains and the like, and the objects of the invention are to provide a connecter of this character which will be securely engaged by merely inserting a stem on one end of the chain into a receiving socket on the other end of the chain, an automatic locking device within the socket holding the stem against removal.

Other objects are to provide a device of this character which will be practically water tight, all of the operative parts of the connecter being enclosed, preventing mud or dirt from entering the same.

In the usual tire chain, it is desirable that the annulus be mounted upon the tire so that it may float upon the same, and for this reason, it is necessary that the connecter be of no greater cross sectional area than the chain and that no projections extend beyond the exterior of the same, thus allowing the annulus to float freely around the tire.

The above and other objects may be attained by providing a connecter such as illustrated in the accompanying drawings, in which—

Figure 1 is a side elevation of the connecter upon an enlarged scale; and

Fig. 2, a longitudinal sectional view through the same.

Similar numerals refer to similar parts throughout the drawing.

The stem 1 preferably has a pointed or tapered end 2, the other end thereof having an eye 3 formed thereon for connection to one end of the chain 4.

The receiving socket comprises the cylinder 5 having the tapered receiving end 6, the other end thereof being internally threaded as at 7 to receive the threaded plug 8 upon which a link 9 is integrally formed for connection to the other end of the chain 4.

A tubular sleeve 10 is inserted within the cylindric casing 5 and provided with the conical head 11 adapted to operate within the tapered extremity 6 of the casing and provided with a plurality of apertures 12 in its sides containing balls 13 arranged to impinge the tapered interior walls of the casing to clamp the stem 1 when inserted through the tubular sleeve, when the conical head of the sleeve is forced endwise into the tapered end of the casing.

The sleeve 10 is shouldered as at 14, a coil spring 15 being located around the sleeve and interposed between the shoulder and the plug 8 for the purpose of normally urging the conical end of the sleeve toward the tapered end of the casing.

The outer end of the cylindric sleeve 10 is closed as shown at 16 and a pin 17 is located transversely through the casing extending outward upon both sides thereof and terminating in round ends, the pin being of no greater length than the diameter of the casing 5.

By this construction, the stem 1 may be entered endwise into the cylindric casing and the tubular sleeve therein, the action of the spring 15 pressing the tubular sleeve endwise and forcing the balls 13 against the tapered end of the casing, clamping the stem between the balls so rigidly that it cannot be withdrawn without positively moving the tubular sleeve endwise against the action of the spring.

In order to release the stem, the pin 17 is grasped or a tool inserted beneath the same for forcing the tubular sleeve endwise against the action of the spring 15, releasing the pressure of the balls 13 upon the stem and allowing the same to be removed from the casing.

It will thus be evident that the chain connecter embodying the invention will be securely engaged by merely inserting the stem upon one end of the chain into the cylindric casing on the other end of the chain and may be easily released by an endwise pull upon the tubular sleeve; and the connecter being of no greater cross sectional area than the chain and having no projections extending beyond the same, will permit the chain to float upon the tire; the operative parts of the connecter being entirely enclosed to prevent mud or dirt from coming into contact with the same.

I claim:—

1. A connecter comprising a pair of members, one of which is a cylindric casing to receive the other member, a rigid link upon one end of the casing connected to one end of a tire chain, a spring pressed, endwise movable clutch sleeve within the casing and extending outward through the end thereof, said outer end being closed, and a transverse pin in said outer end of the clutch sleeve, and extended through said link for releasing the clutch, the other member comprising a stem for insertion into the clutch sleeve and provided with an eye at its outer end connected to the other end of the tire chain.

2. A connecter comprising a pair of members, one of which is a cylindric casing to receive the other member, a rigid link upon one end of the casing connected to one end of a tire chain, a spring pressed, endwise movable, clutch sleeve within the casing and extending outward through the end thereof, and a transverse pin in said outer end of the clutch sleeve and extended through said link for releasing the clutch, the other member comprising a stem for insertion into the clutch sleeve and provided with an eye at its outer end connected to the other end of the tire chain.

3. A connecter comprising a pair of members, one of which is a cylindric casing to receive the other member, a threaded, hollow plug being threaded into one end thereof and provided with an integral link connected to one end of a tire chain, a spring pressed, endwise movable clutch sleeve within the casing and extended through said plug, and a transverse pin in the outer end of the clutch sleeve, and extended through said link, for releasing the clutch, the other member comprising a stem for insertion into the clutch sleeve and provided with an eye at its outer end connected to the other end of the tire chain.

HOMER J. RICHARDS.